United States Patent
Zellner

(10) Patent No.: US 10,499,183 B2
(45) Date of Patent: Dec. 3, 2019

(54) SYSTEMS AND METHODS EMPLOYING MULTIPLE INDIVIDUAL WIRELESS EARBUDS FOR A COMMON AUDIO SOURCE

(71) Applicant: AT&T Intellectual Property I, L.P., Atlanta, GA (US)

(72) Inventor: Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 394 days.

(21) Appl. No.: 14/251,685

(22) Filed: Apr. 14, 2014

(65) Prior Publication Data
US 2014/0219484 A1   Aug. 7, 2014

Related U.S. Application Data

(63) Continuation of application No. 13/471,874, filed on May 15, 2012, now Pat. No. 8,699,732, which is a
(Continued)

(51) Int. Cl.
*H04R 1/10* (2006.01)
*H04S 7/00* (2006.01)
(Continued)

(52) U.S. Cl.
CPC ............. *H04S 7/308* (2013.01); *G10L 15/00* (2013.01); *H04R 1/1041* (2013.01); *H04R 3/00* (2013.01);
(Continued)

(58) Field of Classification Search
CPC ............. H04R 25/552; H04R 25/554; H04R 2420/07; H04R 1/1041; H04R 5/033; H04S 7/308; H04S 1/005; H04S 7/304
See application file for complete search history.

(56) References Cited

U.S. PATENT DOCUMENTS

| | | | | | |
|---|---|---|---|---|---|
| 3,928,733 A | * | 12/1975 | Hueber | ............... | H04R 25/502 381/317 |
| 5,680,506 A | * | 10/1997 | Kroon | .................... | G10L 19/16 704/203 |

(Continued)

FOREIGN PATENT DOCUMENTS

| | | | | |
|---|---|---|---|---|
| WO | WO 2006064170 | | 6/2006 | |
| WO | WO-2007105372 A1 | * | 9/2007 | ............ G02C 11/06 |

OTHER PUBLICATIONS

Release your JABRA, Jabra BT 320s, http://jabra.com, printed Dec. 12, 2007.
(Continued)

*Primary Examiner* — Kile O Blair
(74) *Attorney, Agent, or Firm* — Hartman & Citrin LLC

(57) ABSTRACT

Multiple individual wireless earbuds provide audio from a common audio source. A user may thereby enjoy audio in both ears while also benefiting from an entirely wireless configuration. The individual wireless earbuds may each receive the audio signal from the common audio source and then produce audio accordingly. Each earbud may have a channel setting to define whether a given earbud will produce left channel or right channel audio for a multi-channel audio signal. The individual wireless earbuds may alternatively have a master-slave configuration where a master earbud receives a wireless audio signal from the common source, plays audio based on the audio signal, and transmits a wireless signal based on the wireless audio signal to the slave earbud. The slave earbud then plays audio based on the wireless signal from the master earbud.

20 Claims, 5 Drawing Sheets

Related U.S. Application Data continuation of application No. 11/955,389, filed on Dec. 13, 2007, now Pat. No. 8,180,078.

(51) Int. Cl.
  *H04R 5/033* (2006.01)
  *G10L 15/00* (2013.01)
  *H04R 3/00* (2006.01)
  *H04R 25/00* (2006.01)

(52) U.S. Cl.
  CPC ........... *H04R 5/033* (2013.01); *H04R 25/554* (2013.01); *H04R 1/1066* (2013.01); *H04R 2201/107* (2013.01); *H04R 2420/07* (2013.01)

(56) References Cited

U.S. PATENT DOCUMENTS

| | | | | |
|---|---|---|---|---|
| 6,236,969 B1 * | 5/2001 | Ruppert | ................... | H04M 1/05 704/270 |
| 6,523,006 B1 * | 2/2003 | Ellis | ................... | H04S 1/005 340/435 |
| 6,549,633 B1 * | 4/2003 | Westermann | ........ | H04R 25/453 381/312 |
| 6,707,921 B2 * | 3/2004 | Moore | ................... | G02C 11/06 381/327 |
| 6,810,987 B1 | 11/2004 | DeKalb | | |
| 7,092,745 B1 * | 8/2006 | D'Souza | ............. | H04M 1/0214 379/420.01 |
| 7,136,684 B2 * | 11/2006 | Matsuura | ............... | H04R 5/033 455/41.2 |
| 7,469,155 B2 | 12/2008 | Chu | | |
| 7,509,094 B2 * | 3/2009 | Moran | ................ | H04M 1/0256 455/39 |
| 7,573,525 B2 * | 8/2009 | Yamasaki | ............ | G02B 27/017 348/115 |
| 7,627,289 B2 * | 12/2009 | Huddart | ................. | H04R 5/033 455/343.1 |
| 7,810,750 B2 * | 10/2010 | Abreu | .................... | G02C 3/003 242/378.1 |
| 8,157,730 B2 * | 4/2012 | LeBoeuf | ................ | A61B 5/486 128/920 |
| 8,527,280 B2 * | 9/2013 | Boesen | ................. | G10L 15/005 381/313 |
| 8,738,834 B2 * | 5/2014 | Scales | ................... | G06F 13/426 710/313 |
| 2004/0051788 A1 | 3/2004 | Oka et al. | | |
| 2006/0064037 A1 * | 3/2006 | Shalon | ................. | A61B 5/0006 600/586 |
| 2007/0147629 A1 | 6/2007 | Chiloyan | | |
| 2008/0266448 A1 * | 10/2008 | Reiner | ................. | H04N 5/2251 348/376 |
| 2008/0273163 A1 * | 11/2008 | Sasaki | .................... | G02C 11/06 351/113 |

OTHER PUBLICATIONS

LG Bluetooth Stereo Headset HBS-110, http://buywirelessnow.com, printed Dec. 12, 2007.
U.S. Office Action dated Aug. 16, 2011 in U.S. Appl. No. 11/955,389.
U.S. Notice of Allowance dated Jan. 18, 2012 in U.S. Appl. No. 11/955,389.
U.S. Notice of Allowance dated Nov. 29, 2013 in U.S. Appl. No. 13/471,874.

* cited by examiner

SYSTEMS AND METHODS EMPLOYING MULTIPLE INDIVIDUAL WIRELESS EARBUDS FOR A COMMON AUDIO SOURCE

CROSS-REFERENCE TO RELATED APPLICATIONS

This application is a continuation of U.S. patent application Ser. No. 13/471,874, filed May 15, 2012, entitled "Systems and Methods Employing Multiple Individual Wireless Earbuds for a Common Audio Source," now U.S. Pat. No. 8,699,732, which is incorporated herein by reference in its entirety; and which is a continuation of U.S. patent application Ser. No. 11/955,389, filed Dec. 13, 2007, entitled "Systems and Methods Employing Multiple Individual Wireless Earbuds for a Common Audio Source," now U.S. Pat. No. 8,180,078, which is hereby incorporated by reference herein in its entirety.

BACKGROUND

Embodiments relate to wireless earbuds. More particularly, embodiments relate to utilizing multiple individual wireless earbuds to produce audio from one or more common audio sources.

Users of audio sources, such as personal audio and communications devices, typically use some form of a headset or earbud in order to maintain privacy and/or to avoid annoying bystanders. Initially, earbuds and headsets required a wired connection to the audio source. However, earbuds and headsets have advanced so that the ultimate connection to the audio source may be wireless. Users often prefer a wireless earbud because there is little structure to wear, and, in some cases, the earbud may be nearly unnoticeable while being worn.

While wireless earbuds are becoming commonplace as users desire handsfree operation and no clutter from wires, there are drawbacks. For example, users are restricted to a single wireless earbud, and hence sound only in one ear, if all wires are to be avoided. If users want audio from a common source in both ears, then the user must sacrifice some of the benefits of being entirely wireless since stereo earbuds are linked by a wired connection to a common controller box that maintains the wireless connection to the audio source.

SUMMARY

Embodiments address issues such as these and others by providing multiple individual wireless earbuds that may provide audio from a common audio source. Thus, each earbud may have only a wireless connection so that the user may experience audio in each ear while having an entirely wireless configuration between the multiple earbuds and the common audio source.

Embodiments provide an earbud system that includes a first earbud which includes a first speaker and a first wireless receiver that is in wireless communication with an audio source. The first wireless receiver receives an audio signal from the audio source, and the received audio signal is provided to the first speaker to produce sound from the first earbud. A second earbud includes a second speaker and a second wireless receiver that is in wireless communication with the audio source concurrently with the first wireless receiver. The second wireless receiver receives the audio signal from the audio source, and the received audio signal is provided to the second speaker to produce sound from the second earbud.

Embodiments provide an earbud system that includes a first earbud that receives a first wireless audio signal from an audio source, that transmits a second wireless audio signal, and that outputs audio corresponding to the first audio signal via a first speaker. A second earbud is included and receives the second wireless audio signal from the first earbud and outputs audio corresponding to the second audio signal via a second speaker.

Embodiments provide an earbud that includes a housing that fits onto an ear. The earbud further includes a wireless receiver that receives a first wireless signal from an audio source and a speaker that plays audio based on the first wireless signal. The earbud also includes a wireless transmitter that sends a second wireless signal to a second device different than the audio source.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for a system of earbuds where each individual earbud is wireless, and each earbud plays audio concurrently with the other based on an audio signal from a common audio source. Accordingly, users can enjoy audio from the common audio source in both ears while avoiding the clutter of wires from the earbuds.

Figure 1:
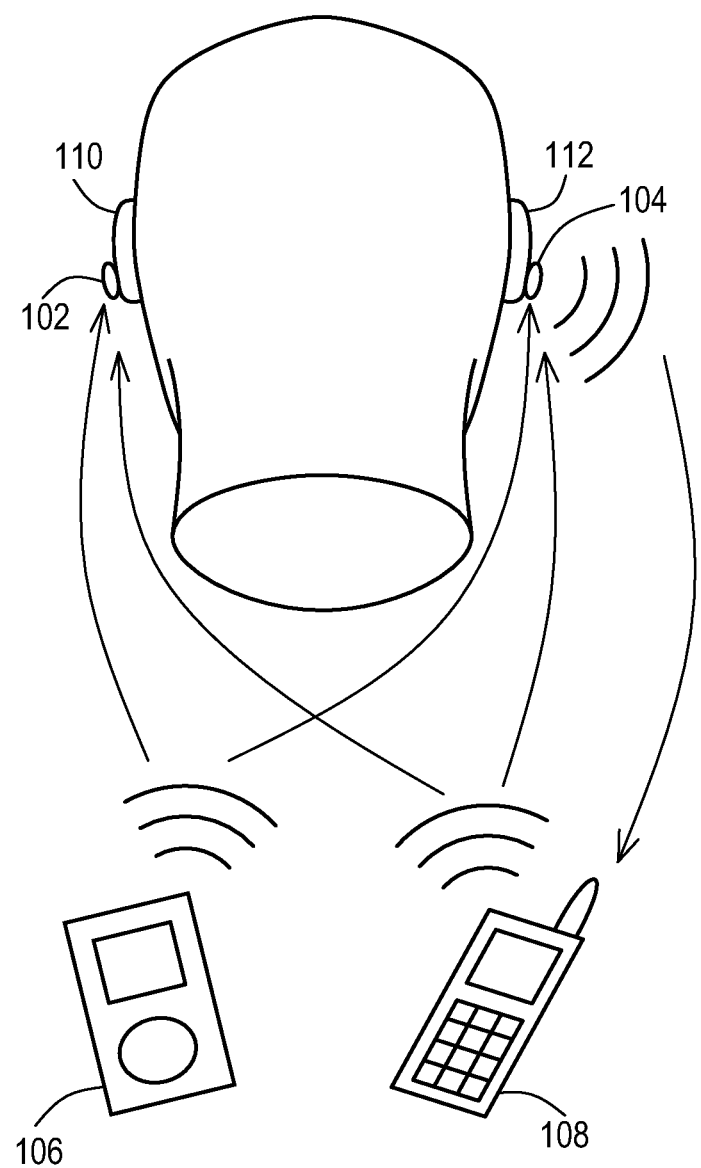
FIG. 1 shows one example of an earbud system utilizing multiple individual wireless earbuds with a common audio source according to various embodiments.

FIG. 1 shows one example of an earbud system. In this example, a first wireless earbud 102 is being worn on an ear 110, while a second wireless earbud 104 is being worn on an ear 112. Also in this example, both wireless earbuds 102, 104 receive a wireless audio signal from an audio source such as a personal digital music player 106 and/or a mobile communications device 108. While the wireless earbuds 102, 104 are shown being worn on or in the ear, it will be appreciated that embodiments of the wireless earbuds 102, 104 may also be worn in proximity to the ear 110, 112 rather than directly on or in the ear 110, 112, such as where the sound is projected into a nearby ear 110, 112 or sound is communicated through surrounding bone to the ear 110, 112.

Both wireless earbuds 102, 104 may receive the audio signal in one of various ways. For example, the audio source 106, 108 may be configured to broadcast the audio signal to any compatible wireless device that is in range. The broadcast may be digital such that other nearby devices may easily reject the broadcast while the earbuds 102, 104 may consume the broadcast.

As another example, the audio source 106, 108 may maintain a communication session, such as via a BLUETOOTH Advanced Audio Distribution Profile (A2DP) or similar wireless digital protocol with at least one of the earbuds 102, 104. Where the audio source 106, 108 is capable of maintaining two concurrent sessions, then each earbud 102, 104 has its own session with the audio source 106, 108. The audio source 106, 108 may be configured to send a first audio channel or group of audio channels via one of the communication sessions while being configured to send a second audio channel or group of audio channels via the other communication session. Thus, for multi-channel audio, each earbud 102, 104 may receive a different channel to provide multi-channel audio for the user. Alternatively, the audio source may send all channels to each earbud 102, 104, and the earbuds 102, 104 may discern which audio channels should be played back.

As another example, the audio sources 106, 108 may maintain only a single communication session, such as via the BLUETOOTH protocol with one earbud 102. However, the second earbud 104 may be configured to eavesdrop on the communication session established for the earbud 102, such that both earbuds 102, 104 get the audio signal from the audio source 106, 108.

For instances where both earbuds 102, 104 get all channels of a multi-channel audio signal from the audio source 106, 108, then the earbuds 102, 104 may either play a combined audio signal or may play pre-designated channels. As discussed below, either or both of the earbuds 102, 104 may include switches to allow a user to manually set which channels of a multi-channel audio signal each earbud 102, 104 will play.

According to one or more illustrative embodiments, in addition to the earbuds 102, 104 receiving audio signals, at least one earbud 104 also sends an audio signal. In the example shown, the earbud 104 sends an audio signal to the communications device 108. The earbud 104 may include a microphone so that the user may have a telephone conversation. The earbud 104 sends an audio signal that includes the audio obtained by the microphone and the communications device 108 then receives that audio signal and sends it out to the other caller.

Figure 2:
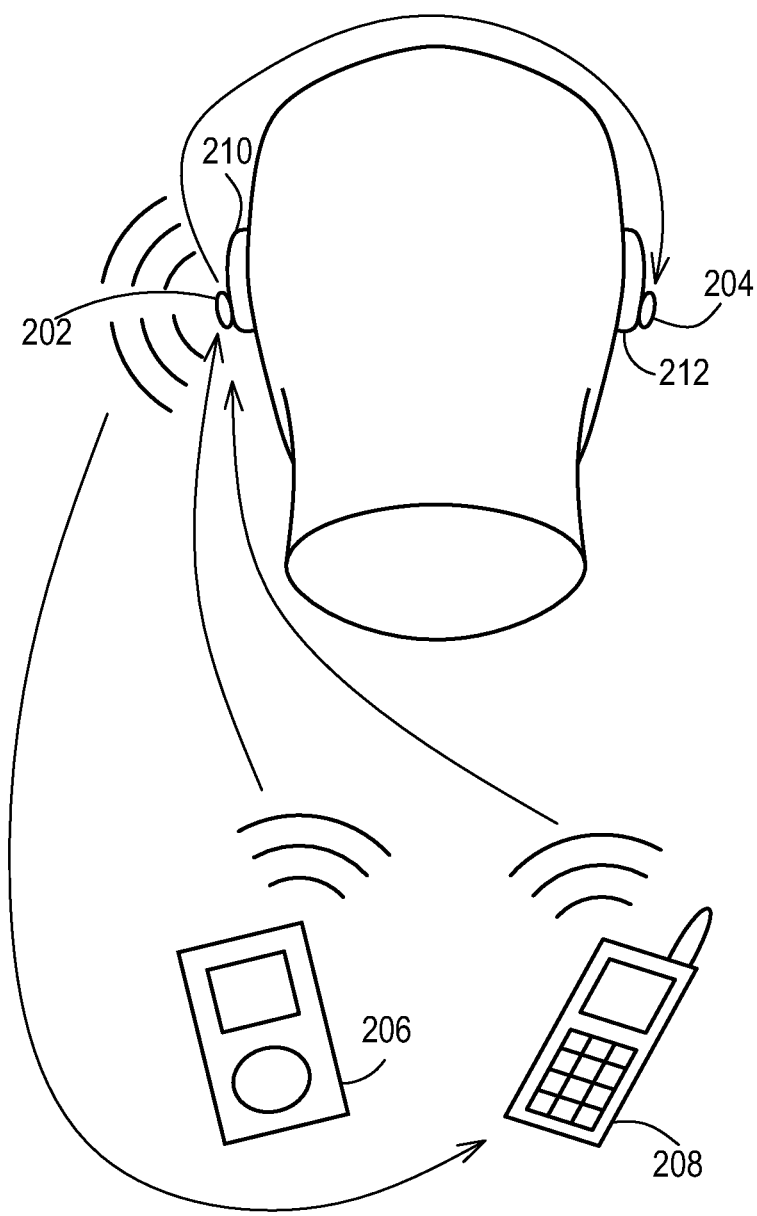
FIG. 2 shows another example of an earbud system utilizing multiple individual wireless earbuds with a common audio source according to various embodiments.

FIG. 2 shows another example of an earbud system. In this example, a first wireless earbud 202 is being worn in, on, or in proximity to an ear 210 while a second wireless earbud 204 is being worn in, on, or in proximity to an ear 212. Also in this example, only the first wireless earbud 202 receives a wireless audio signal directly from an audio source such as a personal digital music player 206 and/or a mobile communications device 208. This audio signal may be of various types, such as a BLUETOOTH protocol digital signal or an analog broadcast.

The second wireless earbud 204 receives an audio signal that is sent by the first wireless earbud 202. Thus, the first wireless earbud 202 acts as a master, while the second wireless earbud 204 acts as a slave. This audio signal that is sent by the first wireless earbud 202 may be of the same type and protocol as the original audio signal from the audio source 206, 208 or may be an entirely different type and/or format. For example, the audio signal from the audio source 206, 208 may be a digital signal of a first protocol, while the audio signal from the first earbud 202 to the second earbud 204 may be an analog signal or a digital signal of a different protocol.

In this example, the content of the audio signal sent from the first earbud 202 may be a duplicate of the content of the audio signal received from the audio source 206, 208. Thus, the first earbud 202 may act to extract the content from the incoming audio signal and then re-package the extracted audio into an audio signal being sent out to the second earbud 204. In that case, both earbuds 202, 204 may play the same audio, such as a combination of all channels for a multi-channel audio signal.

As an alternative to the first earbud 202 duplicating the audio content, the first earbud 202 may instead separate the audio content into its multiple channels, if multi-channel, and then send out a signal that includes those channels that should be played by the second earbud 204. The channels for the first earbud 202 to play versus the channels for the first earbud 202 to send out to the second earbud 204 may be pre-designated. As discussed above, the first earbud 202 may include a selection so that the user can set which channels the first earbud 202 should play and which should be sent to the second earbud 204.

According to one or more illustrative embodiments, in addition to the earbuds 202, 204 receiving audio signals, at least one earbud 202 also sends an audio signal. In the example shown, the earbud 202 sends an audio signal to the communications device 208. As with the previous example of FIG. 1, the earbud 202 may include a microphone so that the user may have a telephone conversation. The earbud 202 sends an audio signal that includes the audio obtained by the microphone and the communications device 208 then receives that audio signal and sends it out to the other caller.

It will be appreciated that the second earbud 204 could include the microphone and transmitter instead of the first earbud 202. However, by including the microphone and transmitter at the first earbud 202, the first earbud 202 may detect that the audio from an audio source 206 or no-call related audio from a communications device 208 should be stopped while a call is in progress and may stop sending audio to the second earbud 204 during that period.

Figure 3A:
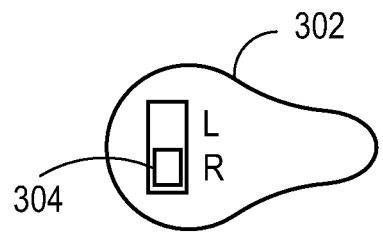
FIG. 3A shows an example of an individual wireless earbud with an audio channel switch according to various embodiments.

FIG. 3A shows one example of an earbud 302. This earbud 302 has a form factor similar to a hearing aid, where the earbud 302 may rest partially within the ear canal. Either or both earbuds of a pair may have this form factor. In this example, the earbud 302 includes a switch 304 that can be user manipulated between a first and a second position.

The first position of the switch 304 corresponds to one channel or grouping of channels of audio. For example, this first position may correspond to the left (L) channel of stereo audio. The second position corresponds to another channel or grouping of channels of audio, for example, the right (R) channel of stereo audio.

Figure 3B:
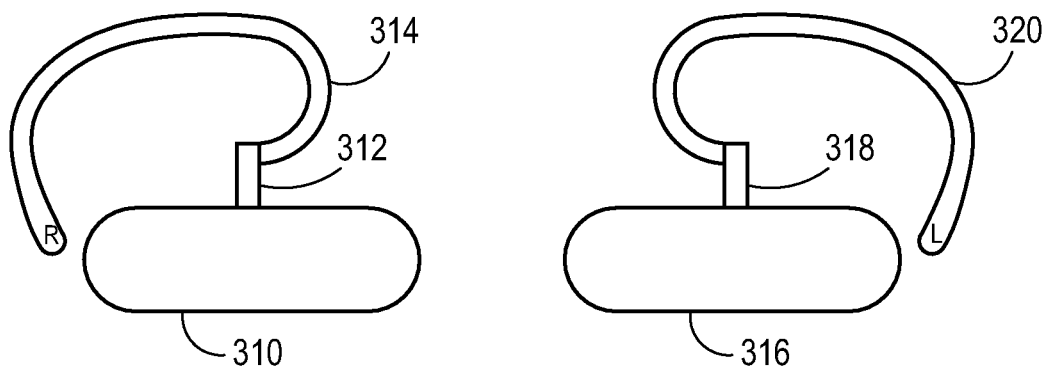
FIG. 3B shows an example of a pair of individual wireless earbuds with ear hanger switches according to various embodiments.

FIG. 3B shows another example of earbuds. These earbuds have a form factor that allows a main body 310, 316 to reside externally but adjacent to the ear of the user. To secure these earbuds in place, an ear hanger 314, 320 is provided to rest on the ear so that the main body 310, 316 is suspended from the ear and is positioned near the ear canal.

The ear hangers 314, 320 are attached to the main bodies 310, 316 by support shafts 312, 318, respectively. According to some illustrative embodiments, the ear hangers 314, 320 may pivot about the support shaft 312, 318 so that a single main body 310, 316 may be used for either a left ear or a right ear. The pivoting of the ear hanger 314, 320 about the support shaft 312, 318 may further serve to manipulate a switch that controls which channels of audio the earbud will play.

In the examples shown, the ear hanger 314 is positioned to fit onto a right ear. Thus, the switch of the earbud is set to allow playback of channels of audio intended for the right ear, such as the right channel of stereo audio. In this example, the ear hanger 314 has an R facing outward to signify to the user that the ear hanger is set for the right ear and that the audio playback will be for the right ear. The ear hanger 320 is positioned to fit onto a left ear. Thus, the switch of the earbud is set to allow playback of channels of audio intended for the left ear, such as the left channel of stereo audio and the ear hanger 320 has an outward facing L to signify this to the user.

Figure 4:
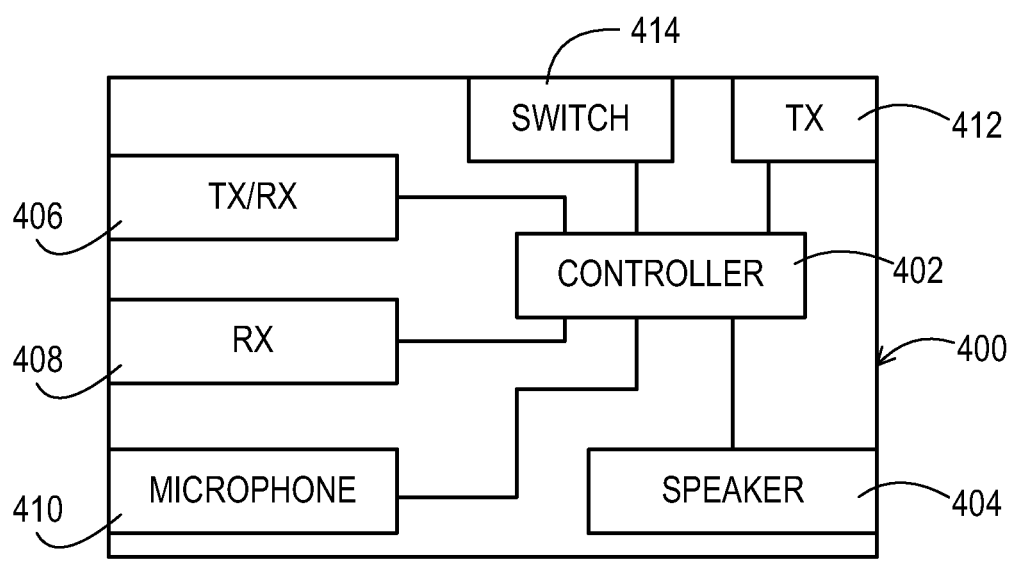
FIG. 4 shows an example of components of a master wireless earbud of an earbud system according to various embodiments.

FIG. 4 shows an example of components of an earbud 400 according to various embodiments. This earbud 400 may correspond to either of the form factors discussed above in relation to FIGS. 3A and 3B as well as other form factors. The earbud 400 includes a controller 402 that performs logical operations to receive audio signals, transmit audio signals, and provide audio playback to the user. The controller may be of various forms such as a general purpose programmable processor, an application specific processor, hard wired digital logic, and various combinations thereof.

The controller 402, where it may store programming or digital logic to be self-executed, is an example of a computer readable medium which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The controller 402 communicates with various other components. The controller 402 may communicate with a wireless receiver 408 that may receive audio from an external device that sends information such as an audio signal to the earbud 400. For example, a digital audio player may broadcast an audio signal or otherwise send an audio signal without requiring a handshake communication session such that the earbud 400 is not required to transmit a confirmation back to the audio source. In that case, the receiver 408 may be the only component directly communicating with the audio source.

According to illustrative embodiments, another component that may be present is a wireless transceiver 406. This transceiver 406 may be used to wirelessly communicate bi-directionally with an external device such as an audio source. For example, the audio source may utilize a digital protocol such as the BLUETOOTH protocol and may require a handshake and/or acknowledgement of communication attempts in order to provide the audio signal. In that case, the transceiver 406 may receive data packets from and also send return data packets to the audio source. As another example, the transceiver 406 may be employed where return audio is to be provided from the earbud 400, such as when communicating with an audio recorder or with a telecommunications device.

The controller 402 may obtain audio to send via the transceiver 406 by a microphone 410. This microphone 410 receives the spoken audio from the user. This microphone 410 may be of various types, such as a first type to have a narrow reception cone to attempt to receive only spoken audio from the user or a second type to have a broad reception cone to attempt to also receive background audio.

The controller 402 provides audio playback to the user by channeling audio signals received via the receiver 408 or transceiver 406 to a speaker system 404. The speaker system 404 includes a transducer and any necessary amplification to produce audio at levels adequate for the user to hear when the earbud 400 is mounted on the ear of the user.

The controller 402 may also be in communication with a switch 414. This switch 414 may be manipulated to control which channels of multi-channel audio this earbud 400 will play through the speaker system 404. As discussed above, this switch 414 may be of various forms such as a slidable switch 304 shown in FIG. 3A or a pivoting shaft 312, 318 as shown in FIG. 3B.

For embodiments where the earbud 400 is a master that provides the audio signals to a slave earbud, either a transmitter such as that of the transceiver 406 or a dedicated transmitter 412 may be included. The controller 402 may provide the audio signal to be received by the slave earbud to the transmitter 412 which then transmits a wireless signal that is received by the slave earbud. As discussed above, this wireless signal to the slave earbud may be of various forms, such as an analog signal or a digital signal corresponding to a particular protocol.

The controller 402 may employ signal processing to the received audio signal to separate the audio signal into the various channels it may include. The controller 402 may then send the appropriate channels of the audio signal to the appropriate components. For example, if the earbud 400 is set to play all received channels, then all channels are provided to the speaker system 404. If the earbud 400 is set to play the right channel, then the controller 402 may provide the right channel to the speaker system 404 while providing the left channel to the transmitter 412 for sending to the slave earbud for playback of the left channel.

Figure 5:
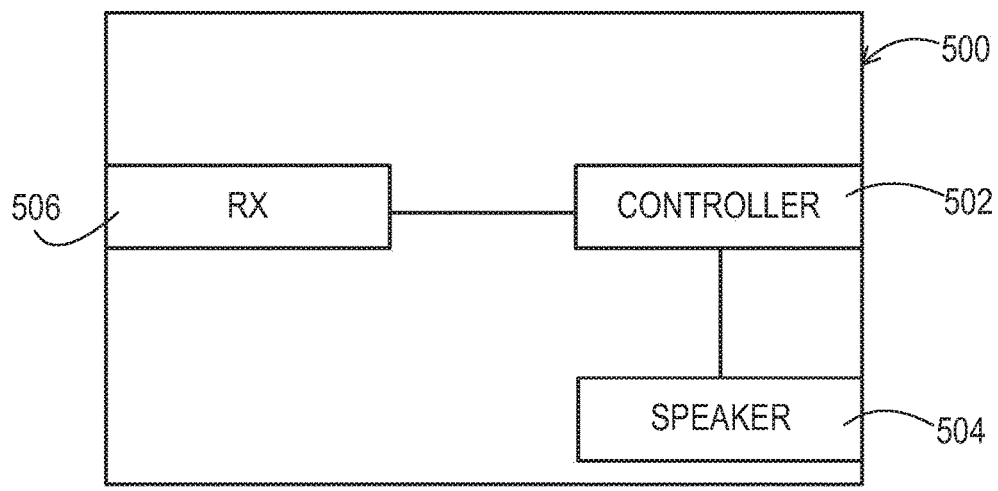
FIG. 5 shows an example of components of a slave wireless earbud of an earbud system according to various embodiments.

FIG. 5 shows examples of components of an earbud 500 that may be a slave earbud that receives audio signals to be played back from a master earbud, such as earbud 400. Furthermore, the earbud 500 may represent an example that is used to receive a communication directly from an audio source, such as where the audio source broadcasts the audio signal to all listening earbuds 500 or as an example where the audio source is capable of maintaining multiple communication sessions with multiple earbuds 500.

The earbud 500 includes a controller 502. This controller 502 communicates with a wireless receiver 506 to receive incoming audio signals. The receiver 506 may be an analog receiver, a digital receiver, or both. The controller 502 obtains the audio signal from the receiver 506 and then provides it to a speaker system 504 that includes a transducer and any amplification needed to produce audio playback at a volume level adequate for a user having the earbud 500 in close proximity to an ear.

Figure 6:
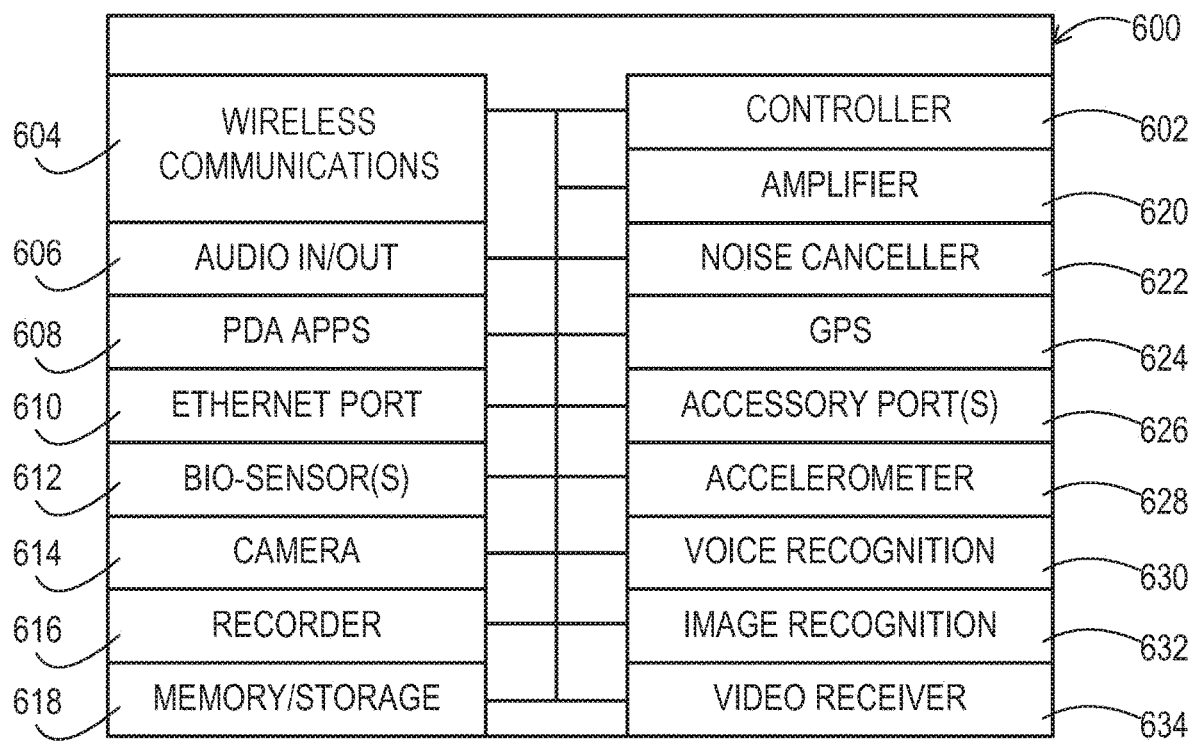
FIG. 6 shows an example of additional components of a wireless earbud according to various embodiments.

FIG. 6 shows examples of components of an earbud 600 that includes a variety of enhanced functions beyond audio playback. To provide for the audio playback and bi-directional audio as discussed above, this earbud 600 includes a controller 602 as well as wireless communications components 604 such as one or more sets of transmitters and receivers to communicate with external audio sources and/or other earbuds. Furthermore, this earbud 600 may include audio input/output components 606 including one or more speakers and one or more microphones.

This earbud 600 may include many other components. For example, a hearing aid amplifier 620 may be present to amplify the sound received through a microphone of the input/output components 606 that is configured to pick up the background rather than the speech of the user. This amplified sound is then played back to the user through a speaker of the input/output components 606 so that the user can hear the background better than if the earbud 600 was not in place.

The earbud 600 may employ a noise canceller module 622 in order to cancel unwanted noise from a signal to be played back or form a signal to be sent out to another earbud or an external audio device. For example, the noise canceller module 622 may cancel noise from the background sounds to be amplified by the hearing aid amplifier 620. As another example, the noise canceller module 622 may cancel noise from the background sounds to be sent to a telecommunications device. As another example, the noise canceller module 622 may cancel noise received in the audio signal incoming from the external audio source, such as noise acquired during the wireless signal transfer.

The earbud 600 may include a geonavigational positioning system (GPS) module 624. The GPS module 624 may keep track of a current geographical location of the earbud 600 and may share that geographical location for use by other on-board components and/or to report to external devices through wireless transmission.

The earbud 600 may include one or more accessory ports 626 that allow for connection to a display device, a keyboard, and the like. Thus, a user may attach such devices and interact with the controller 602 and any applications and modules of the earbud 600 to configure it for use, upload new programming or settings, and download captured data.

The earbud 600 may include an accelerometer 628 that may produce signals in response to movement of the earbud 600. These signals may then be used to produce data that can be stored and reviewed to analyze motion of the earbud 600, and hence motion of the user wearing the earbud 600. For example, this motion data may be used to analyze a medical condition of the user, to measure physical activity of the user, and so on.

The earbud 600 may include a voice recognition module 630. Thus, the user may speak commands or data and the earbud 600 may then recognize the spoken commands or data and respond accordingly. For example, the controller 602 may perform functions in response to a command to perform the functions being output by the voice recognition module. For instance, the volume of the playback may be increased or decreased in response to the user verbally requesting such a change in the volume.

The earbud 600 may include an image recognition module 632. The earbud 600 may also include a camera 614. Thus, upon recording images by the camera 614, the image recognition module 632 may recognize objects or other aspects from the image. For example, the image recognition module 632 may recognize objects signifying a current environment in which a particular volume level should be used for the audio playback.

The earbud 600 may include a video receiver 634 that may receive wireless video signals. The earbud 600 may have video capability such that video can be sent and received through wireless connectivity, e.g., BLUETOOTH protocol, or a temporary wired connection. Thus, an auxiliary display device may provide video playback of video stored by the earbud 600. Alternatively, the earbud 600 may include a display device as an additional attachment and that may be positioned in front of an eye of the user to view the video playback, such as a wired projection display.

The earbud 600 may include various applications 608 such as those typically found in a personal digital assistant (PDA). For example, the earbud 600 may maintain a calendar of events, may track the current date and time, and may provide audible alarms when the time for occurrence of an event has been reached. As another example, the applications 608 may store to-do lists and the like on behalf of the user and may receive input produced by the voice recognition module 630 in response to the user verbally stating information about tasks to be tracked by the earbud 600. A wireless keyboard that may wirelessly connect to the earbud 600 is an alternative manner of entering such textual information.

The earbud 600 may include networking ports such as an Ethernet port 610. Such networking ports may allow the earbud 600 to be accessed via a network or to upload acquired data to the network.

The earbud 600 may include or maintain wireless connectivity to biometric sensors 612 such as temperature sensors, blood pressure monitors, heart rate monitors, blood sugar monitors, and/or other blood monitors. In this manner, the earbud 600 may be utilized to collect such biometric data over time for later downloading and review by the user and/or a physician.

The earbud 600 may also include a recorder module 616. This recorder module 616 may record to a memory 618 any information received, generated, or otherwise acquired by the earbud 600. For example, audio signals that are being sent to the earbud 600 may be recorded for subsequent playback. Likewise, photographs from the camera 614 may be recorded to the memory 618. Accelerometer data, GPS data, biometric data, and the like may be stored to the memory 618. Furthermore, such information may be stored with a time stamp so that the information may be correlated with respect to time to provide for various analyses of user health or behavior.

Figure 7:
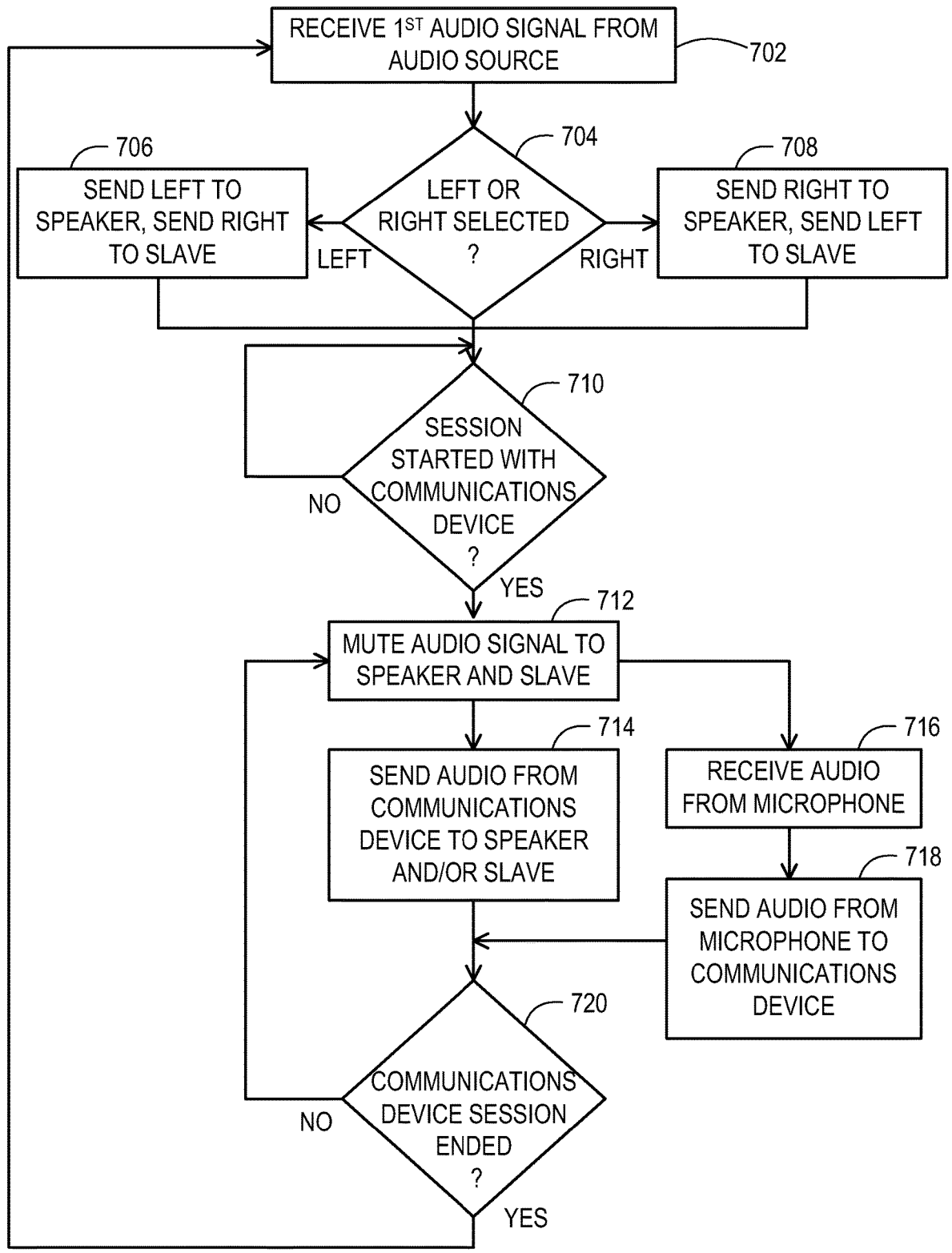
FIG. 7 shows an example of logical operations that may be performed by a master wireless earbud according to various embodiments.

FIG. 7 shows one example of a set of logical operations to be performed by a controller 402 of an earbud 400 for purposes of receiving incoming audio signals, providing for bi-directional communications during a telephone call, and managing a slave earbud 500. At a signal operation 702, the controller 402 receives a first audio signal from an audio source 106. The controller 402 then determines whether the left channel or right channel is selected for this earbud 400 at a query operation 704. Where the left channel is selected, the controller 402 then sends the left channel of the audio signal to the speaker 404 and sends the right channel of the audio signal to the slave earbud 500 at an audio operation 706. Where the right channel is selected, the controller 402 then sends the right channel of the audio signal to the speaker 404 and sends the left channel of the audio signal to the slave earbud 500 at an audio operation 708. While as shown one channel or the other is to be selected, it will be appreciated that a mono selection may also be made available so that both earbuds 400 and 500 play the same mono audio.

The controller 402 monitors for a communication session with a communications device 108, such as a mobile telephone, that takes priority over listening to the audio source 106 at a query operation 710. Once such a communication session is started, the controller 402 then mutes the audio signal to the speaker 404 and to the slave earbud 500 at mute operation 712. The controller 402 then initiates two parallel sets of operations to handle the bi-directional nature of the communication session.

For one of the sets of parallel operations, the controller 402 sends audio from the communications device 108 that is being received as the audio signal to the speaker 404 and/or to the slave earbud 500 at an audio operation 714. The user may prefer to hear the audio of the communication session in one particular ear or in both ears. The controller 402 may thus send the audio to the speaker 404 and/or to the slave earbud 500 so that the audio reaches the desired ear and/or ears.

For the other set of parallel operations, the controller 402 receives audio from the on-board microphone 410 at an audio operation 716. The controller 402 then has this acquired audio sent to the communications device 108 of the communications session at a send operation 718. The controller 402 then detects whether the communications session has ended at a query operation 720. If not, then the controller 402 maintains the muting of the audio signal from the audio source 106 and maintains the parallel sets of operations to continue the bi-directional communication session. Upon detecting the end to the communications session, the controller 402 then resumes receiving the audio signal from the audio source 106 and sending it as appropriate to the speaker 402 and/or the slave earbud 500.

Thus, as discussed above, audio may be provided to both ears of a user by providing an individual wireless earbud for each ear. According to various embodiments, each wireless earbud may communicate directly with one or more common audio sources to obtain an audio signal and/or one wireless earbud may act as a master and provide an audio signal to the other wireless earbud that acts as a slave.

While embodiments have been particularly shown and described, it will be understood by those skilled in the art that various other changes in the form and details may be made therein without departing from the spirit and scope of the invention.

I claim:

1. A method comprising:
receiving, by a master wireless earbud comprising a speaker, a controller, a receiver, and a transmitter, a wireless audio signal from an audio source that transmits, using a first protocol, the wireless audio signal to the master wireless earbud via a master wireless connection between the receiver and the audio source, wherein the wireless audio signal comprises data corresponding to multiple channels of audio, the multiple channels of audio comprising a first channel and a second channel;
separating, by the controller, the wireless audio signal into the first channel and the second channel;
providing, by the controller, the first channel to the speaker for output;
providing, by the controller, the second channel to the transmitter for sending to a slave wireless earbud for output at the slave wireless earbud;
transmitting, by the master wireless earbud and to the slave wireless earbud via a second wireless connection between the transmitter and the slave wireless earbud, the second channel to the slave wireless earbud for output, wherein the second channel is transmitted using a second protocol;
monitoring, by the controller, for a communication session with a communications device;
in response to detecting initiation of the communication session, muting, by the controller, the first channel and the second channel;
initiating, by the controller, operations for bi-directional communications with the communications device;
receiving, by the master wireless earbud, video as wireless video signals;
storing, by the controller and at the master wireless earbud, the video;
wirelessly connecting, by the master wireless earbud, to a display device to create a third wireless connection; and
outputting, by the master wireless earbud, and via the third wireless connection, the video that is stored by the master wireless earbud to the display device.

2. The method of claim 1, further comprising:
capturing, by the master wireless earbud and using a camera included in the master wireless earbud, an image;
analyzing, by the master wireless earbud and using an image recognition module included in the master wireless earbud, the image;
recognizing, by the master wireless earbud and using the image recognition module, an object within the image, wherein the object indicates an environment in which a particular volume is to be used; and
changing, by the master wireless earbud, a volume for output of the first channel, whereby the first channel is output at the particular volume.

3. The method of claim 1, further comprising:
producing, by the master wireless earbud, motion data based on a signal produced by an accelerometer of the master wireless earbud in response to movement of the master wireless earbud; and
storing, by the master wireless earbud, the motion data, wherein the motion data is used to measure physical activity of a user associated with the master wireless earbud.

4. The method of claim 1, further comprising:
collecting, by a biometric sensor included in the master wireless earbud, biometric data; and
storing, at the master wireless earbud, the biometric data.

5. The method of claim 1, wherein outputting the first channel comprises communicating sound corresponding to the first channel through bone surrounding an ear of a user of the master wireless earbud.

6. The method of claim 1, further comprising configuring, by the controller, the master wireless earbud via interactions with a keyboard received by the controller via an accessory port included in the master wireless earbud.

7. The method of claim 1, further comprising:
providing, by the master wireless earbud, an audible alarm at a time associated with an event, wherein the master wireless earbud stores an application configured to maintain a calendar of events comprising the event, to track a current date and time, and to provide the audible alarm at the time associated with the event.

8. The method of claim 1, further comprising:
storing, by the master wireless earbud and using an application stored at the master wireless earbud, a to-do list; and
receiving, by the master wireless earbud and using the application, input produced by a voice recognition module in response to a verbal statement.

9. The method of claim 1, further comprising configuring, by the controller, the master wireless earbud via interactions with a further display device, the interactions being received by the controller via an accessory port included in the master wireless earbud.

10. The method of claim 1, wherein the operations for the bi-directional communications comprise:
sending, by the controller, audio being received from the communications device to the speaker and to the slave wireless earbud;
receiving, by the controller, further audio from an on-board microphone included in the master wireless earbud; and
sending, to the communications device, the further audio.

11. A non-transitory computer readable medium comprising instructions that, when executed by a processor, cause the processor to perform operations comprising:
receiving, at a master wireless earbud that comprises a speaker, a receiver, a controller, and a transmitter, a wireless audio signal from an audio source that transmits, using a first protocol, the wireless audio signal to the master wireless earbud via a master wireless connection between the receiver and the audio source, wherein the wireless audio signal comprises data corresponding to multiple channels of audio, the multiple channels of audio comprising a first channel and a second channel;
separating, by the controller, the wireless audio signal into the first channel and the second channel;
providing, by the controller, the first channel to the speaker for output;
providing, by the controller, the second channel to the transmitter for sending to a slave wireless earbud for output at the slave wireless earbud;
transmitting, to the slave wireless earbud via a second wireless connection between the transmitter and the slave wireless earbud, the second channel to the slave wireless earbud for output, wherein the second channel is transmitted using a second protocol;
monitoring, by the controller, for a communication session with a communications device;
in response to detecting initiation of the communication session, muting, by the controller, the first channel and the second channel;
initiating, by the controller, operations for bi-directional communications with the communications device;
receiving, by the master wireless earbud, video as wireless video signals;
storing, by the controller and at the master wireless earbud, the video;
wirelessly connecting, by the master wireless earbud, to a display device to create a third wireless connection; and
outputting, by the master wireless earbud, and via the third wireless connection, the video that is stored by the master wireless earbud to the display device.

12. The non-transitory computer readable medium of claim 11, wherein the instructions, when executed by the processor, cause the processor to perform operations further comprising:
capturing, using a camera included in the master wireless earbud, an image;
analyzing, using an image recognition module included in the master wireless earbud, the image;
recognizing, using the image recognition module, an object within the image, wherein the object indicates an environment in which a particular volume is to be used; and
changing a volume for output of the first channel, whereby the first channel is output at the particular volume.

13. The non-transitory computer readable medium of claim 11, wherein the instructions, when executed by the processor, cause the processor to perform operations further comprising: configuring, by the controller, the master wireless earbud via interactions with a keyboard received by the controller via an accessory port included in the master wireless earbud.

14. The non-transitory computer readable medium of claim 11, wherein outputting the first channel comprises communicating sound corresponding to the first channel through bone surrounding an ear of a user of the master wireless earbud.

15. The non-transitory computer readable medium of claim 11, wherein the operations for the bi-directional communications comprise:
sending, by the controller, audio being received from the communications device to the speaker and to the slave wireless earbud;
receiving, by the controller, further audio from an on-board microphone included in the master wireless earbud; and
sending, to the communications device, the further audio.

16. A master wireless earbud comprising:
a speaker;
a receiver;
a transmitter;
a controller; and
a computer readable medium that stores instructions that, when executed by the controller, cause the controller to perform operations comprising:
receiving, using the receiver, a wireless audio signal from an audio source that transmits, using a first protocol, the wireless audio signal to the master wireless earbud via a first wireless connection between the receiver and the audio source, wherein the wireless audio signal comprises data corresponding to multiple channels of audio, the multiple channels of audio comprising a first channel and a second channel,
separating, by the controller, the wireless audio signal into the first channel and the second channel,
providing, by the controller, the first channel to the speaker for output,
providing, by the controller, the second channel to the transmitter for sending to a slave wireless earbud for output at the slave wireless earbud,
initiating transmission of the second channel to the slave wireless earbud for output, the transmission being via a second wireless connection between the transmitter and the slave wireless earbud, wherein the second channel is transmitted using a second protocol,
monitoring, by the controller, for a communication session with a communications device,
in response to detecting initiation of the communication session, muting, by the controller, the first channel and the second channel,
initiating, by the controller, operations for bi-directional communications with the communications device,
receiving video as wireless video signals,
storing the video at the master wireless earbud,
wirelessly connecting to a display device to create a third wireless connection, and outputting, via the third wireless connection, the video that is stored at the master wireless earbud to the display device.

17. The master wireless earbud of claim 16, further comprising a camera and an image recognition module, wherein the instructions, when executed by the controller, cause the controller to perform operations further comprising:
capturing, using the camera, an image;
analyzing, using the image recognition module, the image;
recognizing, using the image recognition module, an object within the image, wherein the object indicates an environment in which a particular volume is to be used; and
changing a volume for output of the first channel, whereby the first channel is output at the particular volume.

18. The master wireless earbud of claim 16, further comprising an accessory port, wherein the instructions, when executed by the controller, cause the controller to perform operations comprising:
configuring, by the controller, the master wireless earbud via interactions with a keyboard received by the controller via the accessory port included in the master wireless earbud.

19. The master wireless earbud of claim 16, wherein outputting the first channel comprises communicating sound corresponding to the first channel through bone surrounding an ear of a user of the master wireless earbud.

20. The master wireless earbud of claim 16, wherein the operations for the bi-directional communications comprise:
sending, by the controller, audio being received from the communications device to the speaker and to the slave wireless earbud;
receiving, by the controller, further audio from an on-board microphone included in the master wireless earbud; and sending, to the communications device, the further audio.

* * * * *